(12) United States Patent  
Schentrup et al.

(10) Patent No.: US 8,856,959 B2  
(45) Date of Patent: *Oct. 7, 2014

(54) CREATING DISTINCT USER SPACES THROUGH USER IDENTIFIERS

(71) Applicant: OpenPeak Inc., Boca Raton, FL (US)

(72) Inventors: Philip Schentrup, Parkland, FL (US); Michael Kelly, Deerfield Beach, FL (US); Eoin Hyden, Atherton (AU)

(73) Assignee: OpenPeak Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,634

(22) Filed: Feb. 4, 2014

(65) Prior Publication Data

US 2014/0157437 A1  Jun. 5, 2014

Related U.S. Application Data

(63) Continuation of application No. 13/252,947, filed on Oct. 4, 2011, now Pat. No. 8,650,658.

(60) Provisional application No. 61/406,328, filed on Oct. 25, 2010.

(51) Int. Cl.
```
G06F 21/00      (2013.01)
H04W 12/08      (2009.01)
H04L 29/06      (2006.01)
G06F 21/62      (2013.01)
H04W 12/06      (2009.01)
```
(52) U.S. Cl.
 CPC .............. *G06F 21/62* (2013.01); *H04W 12/08* (2013.01); *H04W 12/06* (2013.01); *H04L 63/104* (2013.01); *G06F 2221/2117* (2013.01); *G06F 2221/2141* (2013.01); *G06F 2221/2149* (2013.01); *G06F 21/6218* (2013.01)
 USPC .................................. 726/28; 726/27; 726/30

(58) Field of Classification Search
 None
 See application file for complete search history.

(56) References Cited

U.S. PATENT DOCUMENTS

| | | | |
|---|---|---|---|
| 5,265,951 A | 11/1993 | Kumar | |
| 5,294,782 A | 3/1994 | Kumar | |
| 5,357,585 A | 10/1994 | Kumar | |
| 5,381,348 A | 1/1995 | Ernst et al. | |
| 5,386,106 A | 1/1995 | Kumar | |

(Continued)

FOREIGN PATENT DOCUMENTS

| | | |
|---|---|---|
| WO | 2010080498 A1 | 7/2010 |
| WO | 2010080500 A1 | 7/2010 |

(Continued)

OTHER PUBLICATIONS

International Search Report and Written Opinion for Int'l Appln. No. PCT/US11/51302 Mailed Jan. 26, 2012, 11 Pages.

(Continued)

*Primary Examiner* — Minh Dinh

(57) ABSTRACT

A method of, and a processing system for, creating distinct user spaces. In a platform originally intended to be a single user platform, for each of a plurality of users, a first application used by the user can be assigned a user identifier (UID) unique to the user and the first application. The first UID can be associated with user data exclusively associated with the user and the first application to create a multi-user platform.

17 Claims, 4 Drawing Sheets

(56) References Cited

U.S. PATENT DOCUMENTS

| | | |
|---|---|---|
| 5,484,989 A | 1/1996 | Kumar et al. |
| 5,489,001 A | 2/1996 | Yang |
| 5,489,773 A | 2/1996 | Kumar |
| 5,519,783 A | 5/1996 | Kumar |
| 5,521,369 A | 5/1996 | Kumar |
| 5,548,477 A | 8/1996 | Kumar et al. |
| 5,548,478 A | 8/1996 | Kumar et al. |
| 5,616,906 A | 4/1997 | Kumar |
| 5,632,373 A | 5/1997 | Kumar et al. |
| 5,638,257 A | 6/1997 | Kumar et al. |
| 5,648,760 A | 7/1997 | Kumar |
| 5,696,496 A | 12/1997 | Kumar |
| 5,708,560 A | 1/1998 | Kumar et al. |
| 5,872,699 A | 2/1999 | Nishii et al. |
| 5,902,991 A | 5/1999 | Kumar |
| 5,925,873 A | 7/1999 | Kumar |
| 6,023,721 A | 2/2000 | Cummings |
| 6,027,021 A | 2/2000 | Kumar |
| 6,072,401 A | 6/2000 | Kumar |
| 6,084,769 A | 7/2000 | Moore et al. |
| 6,104,451 A | 8/2000 | Matsuoka et al. |
| 6,151,606 A | 11/2000 | Mendez |
| 6,181,553 B1 | 1/2001 | Cipolla et al. |
| 6,223,815 B1 | 5/2001 | Shibasaki |
| 6,266,539 B1 | 7/2001 | Pardo |
| 6,276,448 B1 | 8/2001 | Maruno |
| 6,449,149 B1 | 9/2002 | Ohashi et al. |
| 6,457,030 B1 | 9/2002 | Adams et al. |
| 6,647,103 B2 | 11/2003 | Pinard et al. |
| 6,674,640 B2 | 1/2004 | Pokharna et al. |
| 6,684,259 B1 | 1/2004 | Discavage et al. |
| 6,708,221 B1 | 3/2004 | Mendez et al. |
| 6,952,617 B1 | 10/2005 | Kumar |
| 6,952,671 B1 | 10/2005 | Kolesnik et al. |
| 7,058,088 B2 | 6/2006 | Tomita et al. |
| 7,120,462 B2 | 10/2006 | Kumar |
| 7,120,785 B1 | 10/2006 | Bowers et al. |
| 7,130,193 B2 | 10/2006 | Hirafuji et al. |
| 7,149,543 B2 | 12/2006 | Kumar |
| 7,191,469 B2 | 3/2007 | Erlingsson |
| 7,236,770 B2 | 6/2007 | Sankaramanchi |
| 7,243,163 B1 | 7/2007 | Friend et al. |
| 7,275,073 B2 | 9/2007 | Ganji et al. |
| 7,301,767 B2 | 11/2007 | Takenoshita et al. |
| 7,447,799 B2 | 11/2008 | Kushner |
| 7,574,177 B2 | 8/2009 | Tupman et al. |
| 7,574,200 B2 | 8/2009 | Hassan et al. |
| 7,577,462 B2 | 8/2009 | Kumar |
| 7,620,001 B2 | 11/2009 | Ganji |
| 7,620,392 B1 | 11/2009 | Maurya et al. |
| 7,620,731 B1 | 11/2009 | Dasan et al. |
| 7,627,343 B2 | 12/2009 | Fadell et al. |
| 7,702,322 B1 | 4/2010 | Maurya et al. |
| 7,774,838 B2 | 8/2010 | Haltmeyer |
| 7,778,035 B2 | 8/2010 | Huang et al. |
| 7,788,382 B1 | 8/2010 | Jones et al. |
| 7,823,214 B2 | 10/2010 | Rubinstein et al. |
| 7,869,789 B2 | 1/2011 | Hassan et al. |
| 7,885,645 B2 | 2/2011 | Postma et al. |
| 7,890,091 B2 | 2/2011 | Puskoor et al. |
| 7,912,994 B2 | 3/2011 | Cornwell et al. |
| 7,970,386 B2 | 6/2011 | Bhat et al. |
| 8,000,736 B2 | 8/2011 | Forstall et al. |
| 8,010,701 B2 | 8/2011 | Wilkinson et al. |
| 8,012,219 B2 | 9/2011 | Mendez et al. |
| 8,054,211 B2 | 11/2011 | Vidal |
| 8,060,074 B2 | 11/2011 | Danford et al. |
| 8,074,288 B2 | 12/2011 | Sambotin et al. |
| 8,078,157 B2 | 12/2011 | Maurya et al. |
| 8,086,332 B2 | 12/2011 | Dorogusker et al. |
| 8,099,090 B2 | 1/2012 | Postma et al. |
| 8,180,893 B1 | 5/2012 | Spertus |
| 8,185,149 B2 | 5/2012 | Forstall et al. |
| 8,650,658 B2 | 2/2014 | Schentrup et al. |
| 8,677,477 B2 * | 3/2014 | Kim et al. ............... 726/21 |
| 2001/0047363 A1 | 11/2001 | Peng |
| 2002/0013852 A1 | 1/2002 | Janik |
| 2002/0172336 A1 | 11/2002 | Postma et al. |
| 2003/0014521 A1 | 1/2003 | Elson et al. |
| 2003/0090864 A1 | 5/2003 | Kuo |
| 2003/0130984 A1 | 7/2003 | Quinlan et al. |
| 2004/0034853 A1 | 2/2004 | Gibbons et al. |
| 2004/0060687 A1 | 4/2004 | Moss, II |
| 2004/0078812 A1 | 4/2004 | Calvert |
| 2004/0098449 A1 | 5/2004 | Bar-Lavi et al. |
| 2004/0190256 A1 | 9/2004 | Genova et al. |
| 2005/0091658 A1 | 4/2005 | Kavalam et al. |
| 2005/0114686 A1 | 5/2005 | Ball et al. |
| 2005/0131885 A1 | 6/2005 | Komatsu et al. |
| 2005/0144445 A1 | 6/2005 | Yeap et al. |
| 2005/0188318 A1 | 8/2005 | Tamir et al. |
| 2005/0213331 A1 | 9/2005 | Lewis |
| 2006/0030341 A1 | 2/2006 | Pham |
| 2006/0184788 A1 | 8/2006 | Sandhu et al. |
| 2006/0200658 A1 | 9/2006 | Penkethman |
| 2006/0277209 A1 | 12/2006 | Kral et al. |
| 2006/0277311 A1 | 12/2006 | Franco et al. |
| 2007/0006322 A1 | 1/2007 | Karimzadeh et al. |
| 2007/0080823 A1 | 4/2007 | Fu et al. |
| 2007/0143288 A1 | 6/2007 | Kichikawa et al. |
| 2007/0156870 A1 | 7/2007 | McCollum |
| 2007/0169105 A1 | 7/2007 | Amberny et al. |
| 2007/0183772 A1 | 8/2007 | Baldwin et al. |
| 2007/0239878 A1 | 10/2007 | Bowers et al. |
| 2007/0294380 A1 | 12/2007 | Natarajan et al. |
| 2008/0070495 A1 | 3/2008 | Stricklen et al. |
| 2008/0115225 A1 | 5/2008 | Jogand-Coulomb et al. |
| 2008/0125079 A1 | 5/2008 | O'Neil et al. |
| 2008/0134325 A1 | 6/2008 | Kim et al. |
| 2008/0140969 A1 | 6/2008 | Lawrence |
| 2008/0201453 A1 | 8/2008 | Assenmacher |
| 2008/0222621 A1 | 9/2008 | Knight et al. |
| 2008/0281953 A1 | 11/2008 | Blaisdell |
| 2009/0080663 A1 | 3/2009 | Cherian et al. |
| 2009/0150970 A1 | 6/2009 | Hinds et al. |
| 2009/0183254 A1 | 7/2009 | Franco et al. |
| 2010/0011037 A1 | 1/2010 | Kazar |
| 2010/0077035 A1 | 3/2010 | Li et al. |
| 2010/0157543 A1 | 6/2010 | Shohet et al. |
| 2010/0157989 A1 | 6/2010 | Krzyzanowski et al. |
| 2010/0157990 A1 | 6/2010 | Krzyzanowski et al. |
| 2010/0159898 A1 | 6/2010 | Krzyzanowski et al. |
| 2010/0222097 A1 | 9/2010 | Gisby et al. |
| 2010/0242095 A1 | 9/2010 | Mendenhall |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332635 A1 | 12/2010 | Rogel et al. |
| 2010/0333088 A1 | 12/2010 | Rogel et al. |
| 2011/0004941 A1 | 1/2011 | Mendez et al. |
| 2011/0038120 A1 | 2/2011 | Merz et al. |
| 2011/0058052 A1 | 3/2011 | Bolton et al. |
| 2011/0082789 A1 | 4/2011 | Boyd |
| 2011/0082900 A1 | 4/2011 | Nagpal et al. |
| 2011/0093583 A1 | 4/2011 | Piemonte et al. |
| 2011/0145932 A1 | 6/2011 | Nerger et al. |
| 2011/0179483 A1 | 7/2011 | Paterson et al. |
| 2011/0225252 A1 | 9/2011 | Bhat et al. |
| 2011/0238992 A1 | 9/2011 | Jancula et al. |
| 2012/0066223 A1 | 3/2012 | Schentrup et al. |
| 2012/0070017 A1 | 3/2012 | Dorogusker et al. |
| 2012/0088481 A1 | 4/2012 | Postma et al. |
| 2012/0096364 A1 | 4/2012 | Wilkinson et al. |
| 2012/0096365 A1 | 4/2012 | Wilkinson et al. |
| 2012/0102564 A1 | 4/2012 | Schentrup et al. |
| 2012/0117274 A1 | 5/2012 | Lydon et al. |

FOREIGN PATENT DOCUMENTS

| | | |
|---|---|---|
| WO | 2012024418 A1 | 2/2012 |
| WO | 2012037064 A1 | 3/2012 |
| WO | 2012061046 A2 | 5/2012 |
| WO | 2012064870 A2 | 5/2012 |
| WO | 2012064870 A3 | 7/2012 |

(56) References Cited

FOREIGN PATENT DOCUMENTS

OTHER PUBLICATIONS

Welsh et al., Running Linux, 1999, Section 5.7.
Amendment and Reply for U.S. Appl. No. 12/880,778, Dated May 7, 2013, 25 Pages.
Amendment and Reply for U.S. Appl. No. 13/252,940, Dated Sep. 5, 2013, 17 Pages.
Final Office Action for U.S. Appl. No. 13/252,940, Dated Sep. 13, 2013, 22 Pages.
Non-Final Office Action for U.S. Appl. No. 13/252,940, Mailed May 6, 2013 14 Pages.
Final Office Action for U.S. Appl. No. 12/880,778, Dated Jul. 23, 2013, 23 Pages.
Amendment and Reply for U.S. Appl. No. 12/880,778, Filed Dec. 6, 2013, 25 Pages.
Non-Final Office Action for U.S. Appl. No. 12/880,778, Mailed Nov. 7, 2012, 16 Pages.
Pre-Appeal Brief and Amendment for U.S. Appl. No. 13/252,940, Filed Jan. 13, 2014, 5 Pages.
International Search Report and Written Opinion for Int'l Appln. No. PCT/US11/057351, Mailed May 9, 2012, 10 Pages.
Amendment and Reply for U.S. Appl. No. 13/252,947, filed Jul. 12, 2013, 11 Pages.
Non-Final Office Action for U.S. Appl. No. 13/252,947, Mailed Feb. 13, 2013, 5 Pages.
International Search Report and Written Opinion for Int'l Appln. No. PCT/US11/057354, Mailed May 9, 2012, 10 Pages.
Burns, Mobile Application Security on Android—Context on Android Security, Black Hat, 2009.
Jones, Anatomy of the Linux Virtual File System Switch, IBM, 2009.
Holzer, Cryptoloop HOWTO, 2004.
Amendment and Reply for U.S. Appl. No. 12/880,778, filed Mar. 17, 2014, 23 pages.
International Search Report and Written Opinion for International Application No. PCT/US2009/068482, mailed on Feb. 23, 2010, 12 pages.
International Search Report and Written Opinion for International Application No. PCT/US2009/068475, mailed on Apr. 23, 2010, 17 pages.
International Search Report for International Application No. PCT/US2011/038184, mailed on Aug. 26, 2011, 2 pages.
International Search Report and Written Opinion for International Application No. PCT/US2011/048109, mailed on Dec. 12, 2011, 10 pages.
International Search Report and Written Opinion for International Application No. PCT/US2011/060023, mailed on May 25, 2012, 10 pages.
"A Closer Look at Horizon App Manager", webpage available at: <http://www.horizonmanager.com/?page_id=211>, retrieve date: unknown, Copyright 2011, VMware, Inc., 5 pages.
Fulton, S.M., "Xerox Goes Up Against RIM in 'BYOD' Mobile Device Management," dated Feb. 22, 2012 [retrieved Aug. 2, 2012] retrieved from the Internet: <http://www.readwriteweb.com/cloud/2012/02/xerox-goes-up-against-rim-in-b.php>, 4 pgs.
Anonymous: "Tutorial—How to "Mount"/"Umount" Partitions", Feb. 28, 2006, retrieved from the internet: URL: http://ubuntuforems.org/showthread.php?t=137740.
Layton: "User Space File Systems Linux Magizine", Jun. 22, 2010, URL:http//www/linux-mag/com/id/7814/.
Supplementary European Search Report for International Application No. EP11838465, mailed Apr. 30, 2014, 5 pages.
Supplementary European Search Report for International Application No. EP11838466, mailed May 9, 2014, 7 pages.
Simson Garfinkel et al: "Practical Unix & Internet Security", Internet Citation, Feb. 2003, URL:http://proquest.safaribooksonline.com/0596003234.
Supplementary European Search Report for International Application No. EP11825757, mailed May 12, 2014, 7 pages.
"Android NDK How-To: A collection of tips and tricks for NDK users How to force the display of build commands", Jun. 23, 2010.
Anonymous: android symlink app—Google Search, May 2, 2014.

* cited by examiner

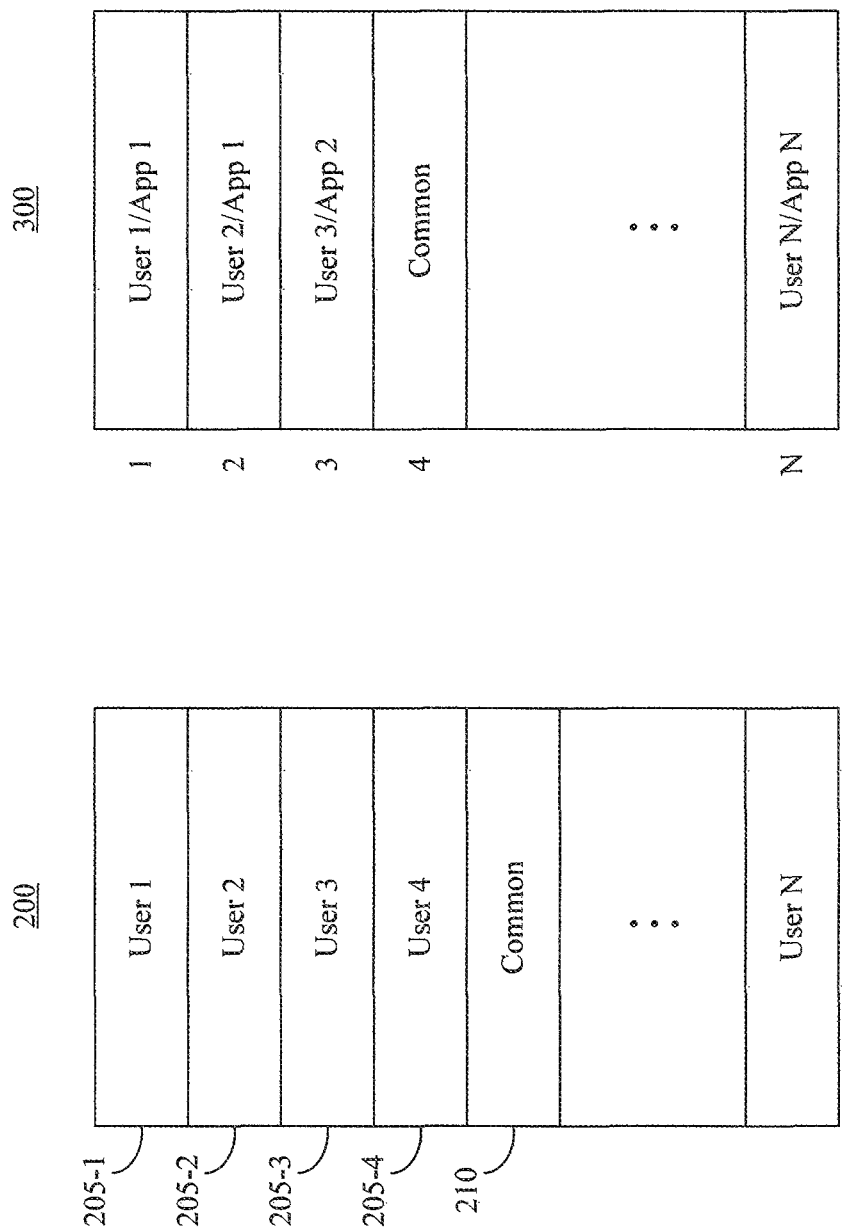

CREATING DISTINCT USER SPACES THROUGH USER IDENTIFIERS

CROSS-REFERENCES TO RELATED APPLICATIONS

This application is a continuation of U.S. patent application Ser. No. 13/252,947, filed on Oct. 4, 2011, which claims priority to U.S. provisional patent application Ser. No. 61/406,328, filed on Oct. 25, 2010, which is herein incorporated by reference.

BACKGROUND OF THE INVENTION

1. Field of Technology

The present description generally relates to operating systems and, more particularly, to multi-user accounts in operating systems with access restrictions.

2. Background

Android™ is a software stack for mobile devices based on the Linux™ platform, and currently is developed by Google, Inc. of Mountain View, Calif. Although Linux™ supports multiple users, Android™ is designed to be a single user platform. In this regard, the Android™ system effectively disables the multi-user aspect of the Linux™ kernel by assigning unique user identifiers (UIDs) to each Android™ application. In particular, when an Android™ application reads or writes data, the application only can access the data with its unique UID. Thus, such an application can only read or modify data that the application itself creates. This feature is necessary to prevent potentially unscrupulous applications from accessing sensitive information generated by other applications.

SUMMARY

Arrangements described herein relate to a method of creating distinct user spaces. The method can include, in a platform originally intended to be a single user platform, for each of a plurality of users, via a processor, assigning to a first application used by the user a user identifier (UID) unique to the user and the first application and associating the first UID with user data exclusively associated with the user and the first application to create a multi-user platform. The method further can include assigning to a second application used by the user a second UID unique to the user and the second application, and associating the second UID with user data exclusively associated with the user and the second application.

The method also can include allocating to the user a range of UIDs, wherein the first UID is selected from the range of UIDs. Applications used by the user can be assigned the UIDs from the range of UIDs in a serially incrementing manner. When at least one of the applications used by the user is removed from the single user platform, a corresponding UID can be returned to a pool of available UIDs.

The method further can include allocating for shared usage among the plurality of users a range of UIDs. UIDs can be assigned to applications used by the plurality of users, wherein the UIDs are assigned to the applications in an interleaved manner. Further, a range of UIDs can be allocated for system or administrative use.

The method further can include receiving from a process a request to access the user data, the request indicating the first UID exclusively unique to the user and the first application. The process can be allowed to access the user data corresponding to the user and the first application.

The method further can include providing user level-servicing using a loop device-based file system to enable the single user platform to accommodate multiple users. The method also can include providing a new filing system for the single user platform by writing a list of functions configured to support and adding an entry into a Virtual Filesystem Switch (VFS) table to enable the single user platform to accommodate multiple users.

Arrangements described herein also relate to a processing system. The processing system can include a processor configured to, in a platform originally intended to be a single user platform, for each of a plurality of users, assign to a first application used by the user a first user identifier (UID) unique to the user and the first application and associate the first UID with user data exclusively associated with the user and the first application to create a multi-user platform.

The processor further can be configured to assign to a second application used by the user a second UID unique to the user and the second application and associate the second UID with user data exclusively associated with the user and the second application. A range of UIDs can be allocated to the user, wherein the first UID is selected from the range of UIDs. The UIDs from the range of UIDs can be assigned to applications used by the user in a serially incrementing manner. When at least one of the applications used by the user is removed from the single user platform, a corresponding UID can be returned to a pool of available UIDs.

The processor further can be configured to allocate for shared usage among the plurality of users a range of UIDs. UIDs can be assigned to applications used by the plurality of users, wherein the UIDs are assigned to the applications in an interleaved manner. Further, a range of UIDs can be allocated for system or administrative use.

The processor further can be configured to receive from a process a request to access the user data, the request indicating the first UID exclusively unique to the user and the first application and allow the process to access the user data corresponding to the user and the first application.

The processor further can be configured to provide user level-servicing using a loop device-based file system to enable the single user platform to accommodate multiple users. The processor also can be configured to provide a new filing system for the single user platform by writing a list of functions configured to support and add an entry into a Virtual Filesystem Switch (VFS) table to enable the single user platform to accommodate multiple users.

Another embodiment can include a computer program product including a computer-readable storage medium. The computer-readable storage medium can include computer-usable program code stored thereon to perform the various steps and/or functions disclosed within this specification.

BRIEF DESCRIPTION OF THE DRAWINGS

Embodiments will be described below in more detail, with reference to the accompanying drawings, in which:

FIG. 2 depicts user ranges in accordance with one embodiment of the present invention;

FIG. 3 depicts user ranges in accordance with another embodiment of the present invention;

DETAILED DESCRIPTION

Figure 1:
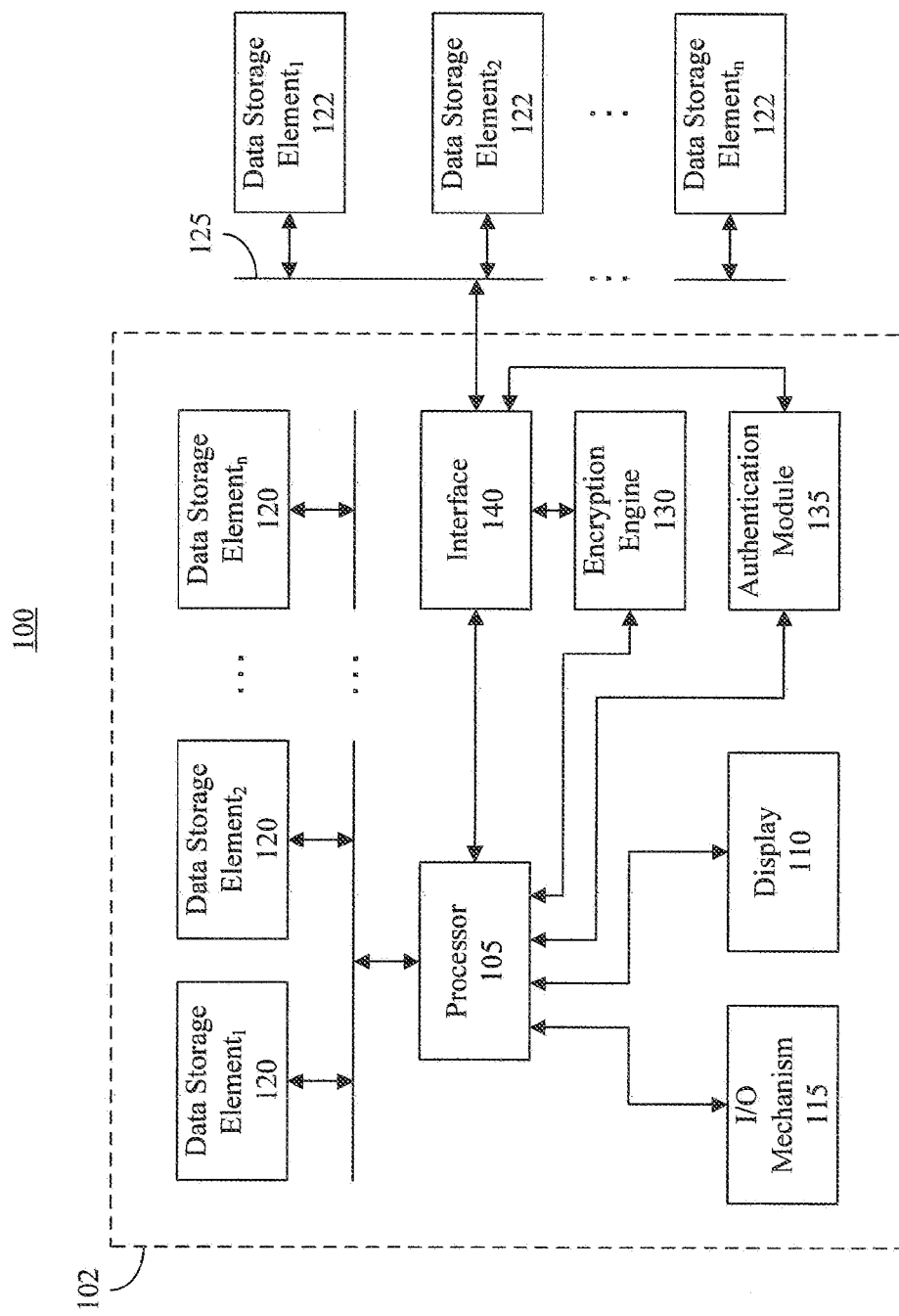
FIG. 1 is a block diagram illustrating a system in accordance with one embodiment of the present invention.

While the specification concludes with claims defining features that are regarded as novel, it is believed that the claims will be better understood from a consideration of the description in conjunction with the drawings. As required, detailed embodiments are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ virtually any appropriately detailed structure. Further, the terms and phrases used herein are not intended to be limiting but rather to provide an understandable description.

Several definitions that apply throughout this document will now be presented. The term "current user" is defined as a user of the plurality of users who currently has access to the programs and/or features of a computing device. A "user space" is defined as an environment reserved for a particular user where that user may access various types of data and perform other computing or communication operations. A "platform" is defined as an operating environment composed of hardware and/or software components that serve as interfaces or specifications for interactions within a processing device. A "single user platform" is defined as a platform that is designed to accommodate a single user space and possibly an administrator with default control over the platform. A "multiple user platform" is defined as a platform that is designed to accommodate a more than one user space and possibly an administrator with default control over the platform. The phrase "originally designed as a single user platform" is defined as a platform that is or was intended to be a single user platform but that has or will be altered or modified in some way to accommodate more than one user space. The phrase "collectively store data" is defined as a process in which multiple portions of data are stored across multiple storage elements or across a single storage element.

The term "computing device" is defined as an electronic device configured to conduct various operations that manipulate or process data. A "network" is defined as a collection of two or more components in which the components are permitted to at least exchange signals with one another. The word "data" is defined as all forms of information that are capable of being generated and at least temporarily stored. The word "plurality" means a number that is greater than one.

A "processor" is defined as a component or a group of components that execute(s) sets of instructions. A "computer-readable-storage medium" is defined as a non-transitory storage device that can contain, or store, a program for use by or in connection with an instruction execution system, apparatus or device. Examples of a computer-readable-storage medium include, but are not limited to, a hard disk drive (HDD), a solid state drive (SSD), a read-only memory (ROM), an erasable programmable read-only memory (EPROM or Flash memory), a portable compact disc read-only memory (CD-ROM), a digital versatile disk (DVD) and a floppy disk. A "program product" is defined as a device comprising a computer-readable-storage medium having stored thereon computer-usable program code.

An "interface" is defined as a component or a group of components that connect(s) two or more separate systems or elements such that signals can be exchanged between or among them. A "directory" is defined as a digital file system structure that includes files and folders and that organizes the files and folders into a hierarchical organization. The word "link" is defined as an object that specifies the location of another object. A "symbolic link" is defined as a file system construct that contains a reference to another file or directory in the form of an absolute or relative path and that affects pathname resolution.

A "data storage element" is defined as a component or a group of interconnected components that are configured to retain data subject to retrieval. The term "non-volatile data storage element" means a data storage element, such as a computer-readable storage medium, that is configured to retain data irrespective of whether the data storage element is receiving power. The term "volatile data storage element" means a data storage element that requires power during at least some interval to retain data. An example of volatile data storage is random access memory (RAM).

The term "fixed allocation" is defined as an allocation of memory/storage that is assigned prior to the execution of any programs or operations that may utilize the allocation and stays static during such execution of the programs or operations. In contrast, a "dynamic allocation" is defined as an allocation of memory/storage that may or may not be assigned prior to the execution of any programs or operations that may utilize the allocation and is adjustable prior to, during or following such execution of the programs or operations. The terms "encrypt" or "encrypting" are defined as altering or translating data to restrict access to the data, while the terms "decrypt" or "decrypting" are defined as decoding data that has been encrypted. The word "orthogonal" is defined as a state in which two or more pieces of information or data are separated from one another and there is no overlap between (or among) them.

As noted, the Android™ system relies on user identifiers (UIDs) to isolate application data. All applications or application suites may have unique UIDs that are typically generated at installation. Generally, only applications that create a file are able to access that file because the Linux file permissions do not allow global access to application data. The data normally only can be accessed by a process with the same UID of the application, and all applications typically have unique UIDs. This data protection mechanism can be extended not only to isolate data from different applications, but also to segregate data from the same application created by different users. In general, the association of a unique UID based on, for example, both user and application type can be used to prevent users from accessing any data but their own by making all UIDs for a particular user orthogonal to the UIDs for all other users.

Additionally, system file I/O functions can be modified to read and write common file names differentiated by UID. For example, if an application with UID 0x1234 attempts to write a file foo.txt, the modified file I/O functions can append the UID of the application to the file name. In this example, the name of the file in the file system would be foo.txt-1234, but the application need not read and write to the file as foo.txt. This would allow applications common to multiple users to persist data to a data storage element without their data colliding. Additionally, the modified file I/O read functions can be configured to first look for the file name specified with the appropriate suffix. If this file does not exist, then the I/O read functions can attempt to find a file with the corresponding file name not having a suffix. This process can be implemented so that applications could find pre-existing system files which would be common to all users. This process can be implemented for each directory or file element in a file path.

FIG. 1 is a block diagram illustrating a system 100 in accordance with one embodiment of the present invention. The system 100 can include a processing device 102. The processing device 102 can be a computer (e.g., a desktop computer, a laptop computer, a notebook computer, a tablet computer, or the like), a personal digital assistant (PDA), a mobile telephone (e.g., a smart phone), an entertainment device, or any other device suitable for processing data.

The processing device 102 can include a processor 105, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

In one arrangement, the processing device 102 also can include one or more input/output (I/O) devices, for example a display 110. In one arrangement, the display 110 can be a touch screen display, though the invention is not limited in this regard. Another example of an I/O device can include an I/O mechanism 115, such as a keyboard, a mouse, or the like. Of course, the display 110, if built as a touch screen display, may serve as the I/O mechanism 115. It should be noted, however, that the processing device 102 is not necessarily limited to these types of user interface elements, as other forms of such components may be implemented into the processing device 102.

The I/O devices can be coupled to the processor 105 either directly or through intervening I/O controllers. One or more interfaces 140 also can be coupled to the processor 105 to enable the processing device 102 to become coupled to other systems, computer systems, remote printers, and/or remote storage devices through intervening private or public networks. Modems, cable modems, Ethernet cards and communication ports are examples of different types of interfaces 140 that can be used with the processing device 102. Examples of communication ports include, but are not limited to, serial ports, parallel ports, universal serial bus (USB) ports, IEEE-1394 (FireWire) ports, serial ATA (SATA) ports, external SATA (eSATA) ports, and the like.

The processing device 102 also can include one or more data storage elements 120, 122, which can be used to store various forms of data. The data storage elements 120, 122 can be volatile data storage elements or non-volatile data storage elements. The data storage elements 120 can be integrated within (permanently or temporarily) the processing device 102. As such, the data storage elements 120 can be referred to as local data storage elements. The data storage elements 120 can be coupled to the processor 105 either directly or through intervening I/O controllers.

The data storage elements 122 can be communicatively linked to the processing device 102 via the communication network 125, via a communication port, or in any other suitable manner. As such, the data storage elements 122 can be referred to as remote data storage elements. The communication network 125 can comprise a wide area network (WAN), such as the Internet, a local area network (LAN), a personal area network (PAN) (e.g., Bluetooth®), and/or any other suitable communication systems. In this regard, the communication network 125 can include wired and/or wireless communication links.

An operating system and/or one or more applications can be stored to one or more of the data storage elements 120, 122, and executed by the processor 105 to implement the methods and processes described herein. Although there are references to Linux™ and Android™ operating systems, it should be noted that the description contained herein is applicable to any operating system, kernel or software platform where support for multiple-user accounts is not provided or available.

In one arrangement, the processing device 102 can also include an encryption engine 130, which can be used to selectively encrypt and/or decrypt data. Any suitable type and number of encryption and decryption techniques can be employed to ensure secure and efficient retrieval of data. As another option, the processing device 102 can include an authentication module 135 for authenticating one or more users of the processing device 102. The authentication module 135 can perform authentications on its own or in conjunction with one or more other elements, as will be described herein.

If desired, the encryption engine 130 and the authentication module 135 can be directly and communicatively coupled to the interface 140 for exchanging signals with the communication network 125 or other external elements. In one arrangement, the encryption engine 130 and the authentication module 135 can be embodied as application specific devices coupled to the processor 105 either directly or through intervening I/O controllers. In another arrangement, the encryption engine 130 and the authentication module 135 can be embodied as applications executable by the processor 105. In this regard, the encryption engine 130 and the authentication module 135 can be stored on one or more data storage elements communicatively linked to the processor 105.

In accordance with the description herein, the processing device 102 can be configured to accommodate multiple users. This feature is possible even if the processing device 102 is equipped with a platform that was originally intended for use by a single individual. In particular, each user can operate the processing device 102 and can generate, store and retrieve data on the processing device 102. This data can be stored on any number or type of the data storage elements 120, 122 including those that are communicatively linked to the processing device 102 via the communication network 125. In addition, a particular user's data can be protected from unauthorized access by any of the other users of the processing device 102. These processes can be achieved with minimal affect on the original single user platform of the processing device 102.

To configure the processing device, an operating system, for example Linux™ or Android™, can be executed by the processor 105. Additional software and/or applications also may be executed by the processor 105. In one arrangement, user-level servicing using a loop device-based file system, such as Filesystem in Userspace (FUSE) or vnode disk (vnd), can be provided as additional software that executes on top of the operating system to enable the platform of the processing device 102 to accommodate multiple users, thereby facilitating creation of a multi-user platform. In another arrangement, a FUSE kernel module and FUSE library can be integrated into to the operating system.

In another aspect of the present arrangements, for example within the Linux™ or Android™ operating system, a new filing system for the platform can be created by writing a list of functions configured to support, and an entry can be added into a Virtual Filesystem Switch (VFS) table. A VFS is a kernel data structure that contains an entry for each type of filing system that the kernel has knowledge. Examples of such filing systems include, but are not limited to, ext3, msdos, procfs and sysfs. Each entry in a VFS can include a list of functions that implement file-related system calls (e.g., mount, open, read, write, stat, etc) for a particular type of filing system. The functions in the new filing system can be configured to call such functions in one or more other filing systems. In this regard, semantics for the new file system can be layered onto an existing file system's data layout (e.g., ext3 or msdos).

User data can be stored on any suitable number/combination of data storage elements 120, 122. There are several techniques for realizing isolation of the user data. In particular, a predetermined number of user ranges can be generated with each range being associated with all or at least some of the users of a computing device. Referring to FIG. 2, an arrangement 200 of numerous user ranges 205-1, 205-2, 205-3, 205-4 is shown. As an example, each user range 205 can represent a range of UIDs that may be allocated to a particular user. In this regard, each user range 205 can comprise a portion of the total number of available UIDs.

In one embodiment, the UID can be an unsigned integer value, and the number of available UIDs can depend on the operating system and other relevant restrictions. In illustration, some systems support 16 bit UIDs. In such cases, slightly over 65,000 UIDs may be available. Other systems may support 32 bit UIDs, which may increase the number of available UIDs to over four billion. In any event, the number of available UIDs can be allocated among (or between) the multiple users in any suitable manner.

One specific (but non-limiting) example will be presented. Assume that the system supports a 16 bit UID. The UID space can be segmented into sixty-five possible user accounts, with each being assigned one thousand UIDs. User 1 can be allocated the range 0-999 (or 1-999), user 2 can be allocated the range 1,000-1,999 and user 3 can be allocated the range 2,000-2,999. The remaining user accounts can be assigned ranges in accordance with this particular allocation. Whenever a UID is assigned for an application used by a particular user, the UID can be assigned from that particular user's allocated range. Once allocated, the UID can be unique to the user and the application, at least until the UID is returned to the pool of available UIDs, for example when the application is removed from the platform.

In another example, a range of UIDs can be allocated to a plurality of users. Whenever a UID is assigned for an application used by a particular user, the UID can be assigned from the allocated range. Again, once allocated, the UID can be unique to the user and the application, at least until the UID is returned to the pool of available UIDs, for example when the application is removed from the platform.

There are several other issues to consider in this technique. Specifically, this assignment of ranges can apply to any type of UID. Moreover, any number of user accounts may be created, and an equivalent number of UIDs may be assigned to each range. It is understood, however, that the assignment of UIDs is not necessarily limited to an equal-weighted fashion, as some ranges may contain a greater or fewer number of UIDs in comparison to other ranges. Also, some of the ranges may be reserved for system or administrative use. In another arrangement, one or more common user ranges 210 may be generated. The UIDs in a common user range 210 may be common to all or at least a plurality of users. Here, an application may be assigned a common UID from this range 210, and these common users may be able to access the data for the application and can share the data. That is, users are able to create shared resources by having common UIDs for applications.

In an alternative embodiment, UIDs can be assigned in a serially incrementing manner. For example, each application can have a UID assigned to it at install time, which can be a higher integer value than the last application installed by any user. Although not necessarily limiting, the UIDs can be serially incremented by a value of one. An exemplary illustration is presented in FIG. 3. There, an arrangement 300 is shown in which the first entry relates to a first application restricted to user 1, which has a UID of 1. As an example, a second user (user 2) may install the same application (which can be restricted to user 2), and the UID can be incremented by one to a value of 2. As another example, a third user (user 3) can install a second application (which can be restricted to user 3), and the UID can be incremented to a value of three. Like the previous embodiment, common UIDs can be used to allow for multiple (or even all) users to access and share data and share, and these UID values can be incremented in a fashion similar to that described here.

In this way, applications can be assured a unique UID, but it is not necessary to have a clear segmentation of UIDs. This particular mapping of UIDs can be saved to persistent storage to provide explicit information on the UID subsets for the users. This process can also allow for an uneven distribution of UIDs among (or between) the users. In addition, the UIDs can be re-mined as time goes on and previously installed applications are removed. Although the incrementing value of one is presented, it is understood that the UIDs can be incremented in accordance with any other suitable value.

In either of the techniques described here, common group identifications (GID) can be used to allow groups of users to access common data. If a common UID is associated with all users to thereby permit all users to access application data, a common GID can allow more than one user but less than all users to access and share application data. Several exemplary types of data include application data, cache data, media data and system configuration data. The term "application data" is defined as data that is associated with programs designed for direct interaction with an end user. In addition, the term "cache data" is defined as data that is or will be temporarily stored in a storage mechanism. The term "media data" is defined as data that is associated with the presentation of entertainment to a user. The term "system configuration data" is defined as data that is used to configure a platform, application, or other software for operation on a device or system. The examples presented here, however, are not intended to be limiting. Referring again to FIG. 1, in one particular arrangement, the application data can be stored in one data storage elements 120, 122, while the cache data associated with the users can be stored at a different location of the data storage elements 120, 122 or on a different data storage element 120, 122.

Figure 4:
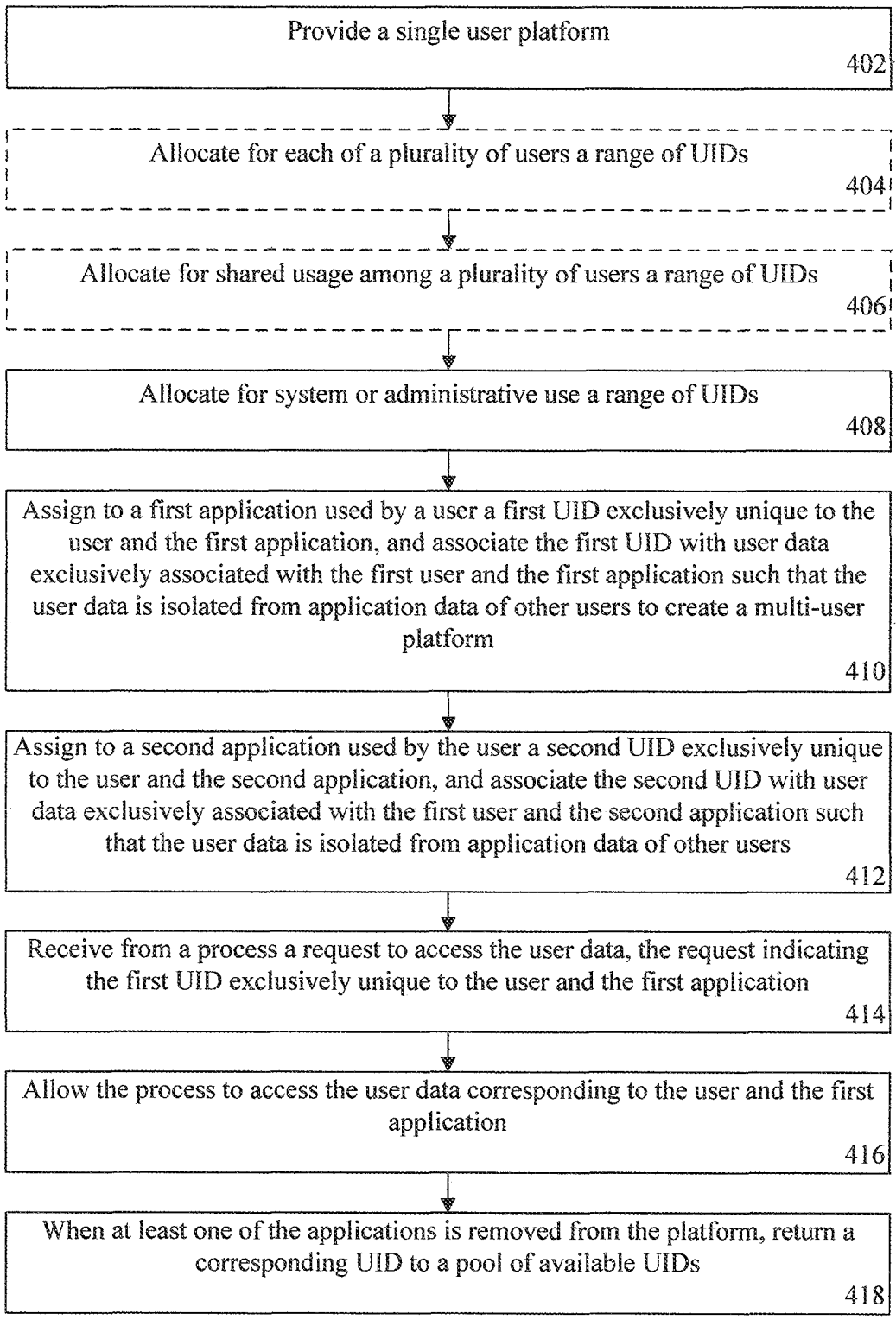
FIG. 4 is a flowchart illustrating a method for creating multiple independent user spaces in accordance with one embodiment of the present invention.

FIG. 4 is a flowchart illustrating a method 400 for creating multiple independent user spaces in accordance with one embodiment of the present invention. The method 400 is not necessarily limited to the chronological order presented in FIG. 4, as these steps can be executed in accordance with any suitable sequence. Also, the method 400 may be adjusted to include other processes or operations not recited here or to remove some of the steps illustrated in FIG. 4.

At step 402, a single user platform can be provided on a processing device. At step 404, a range of user identifiers (UIDs) can be allocated to each of a plurality of UIDs. At step 406, a range of UIDs can be allocated for shared usage among a plurality of users. Step 406 can be performed in addition to, or in lieu of, step 404. In one arrangement, for example, each user can be allocated a range of UIDs exclusive to the respective users, and another range of UIDs can be allocated for use by a plurality of users. At step 408, a range of UIDs can be allocated for system or administrative use.

At step 410, a first UID can be assigned to a first application used by the user. The first UID can be selected from the range of UIDs exclusively allocated to the user, or selected from the range of UIDs allocated for shared usage among the plurality of users. In either arrangement, once assigned, the first UID can be unique to the first user and the first application, at least until the first UID is returned to the pool of UIDs from which the first UID was assigned. UIDs assigned from the shared range of UIDs can be assigned to applications used by the respective users as needed in a serially incrementing manner. In this regard, the UIDs can be assigned to applications used by the plurality of users in an interleaved manner. For example, a first UID can be assigned to a first application used by a first user, a second UID can be assigned to an application used by a second user, and a third UID can be assigned to a second application used by the first user.

At step 412, a second UID can be assigned to a second application used by user. The second UID can be selected from the range of UIDs allocated to the user, or selected from the range of UIDs allocated for shared usage among the plurality of users. In either arrangement, once assigned, the second UID can be unique to the first user and the second application, at least until the second UID is returned to the pool of UIDs from which the second UID was assigned. User identifiers also can be assigned to applications used by other users as described above.

At step 414, a request to access the user data can be received from a process, the request indicating the first UID exclusively unique to the user and the first application. At step 416, the process can be allowed to access the user data corresponding to the user and the first application. Further, additional requests from the process, or other processes, indicating other UIDs exclusively unique to users and applications, and such processes can be allowed to access corresponding user data. At step 418, when at least one of the applications is removed from the platform, a corresponding UID can be returned to a pool of available UIDs from which the UID was assigned. Accordingly, the UID can be made available to be reassigned to the first application or another application when needed.

Figure 5:
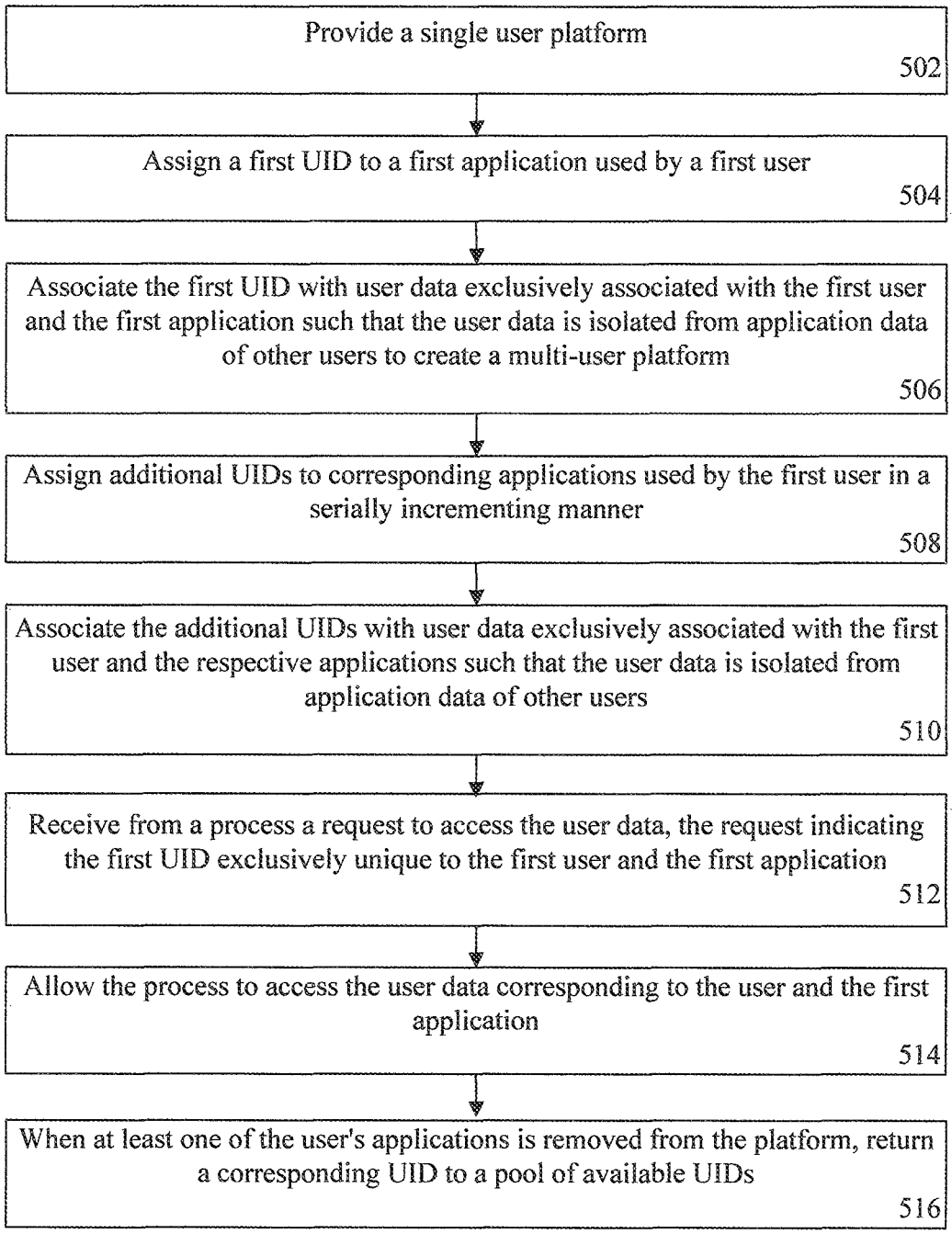
FIG. 5 is a flowchart illustrating a method for creating multiple independent user spaces in accordance with another embodiment of the present invention.

FIG. 5 is a flowchart illustrating a method 500 for creating multiple independent user spaces in accordance with another embodiment of the present invention. The method 500 is not necessarily limited to the chronological order presented in FIG. 5, as these steps can be executed in accordance with any suitable sequence. Also, the method 500 may be adjusted to include other processes or operations not recited here or to remove some of the steps illustrated in FIG. 5.

At step 502, a single user platform can be provided on a processing device. At step 504, a first UID can be assigned to a first application used by the first user. At step 506, additional UIDs can be assigned to additional applications used by the first user in a serially incrementing manner. Further, UIDs can be assigned for shared usage among a plurality of users and UIDs can be assigned for system or administrative use in a serially incrementing manner.

At step 508, a request to access the user data can be received from a process, the request indicating the first UID exclusively unique to the first user and the first application. At step 510, the process can be allowed to access the user data corresponding to the user and the first application. Further, additional requests from the process, or other processes, indicating other UIDs exclusively unique to users and applications, and such processes can be allowed to access corresponding user data. At step 512, when at least one of the applications used by the user is removed from the platform, a corresponding UID can be returned to a pool of available UIDs.

The flowchart and block diagram in the figures illustrate the architecture, functionality, and operation of possible implementations of systems, methods and computer program products according to various embodiments. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable or computer-readable program code that, when being loaded and executed, controls the processing system such that it carries out the methods described herein. The systems, components and/or processes also can be embedded in a non-transitory computer-readable storage medium, such as a computer-readable storage medium of a computer program product or other data programs storage device, readable by a machine, tangibly embodying a program of instructions executable by the machine to perform methods and processes described herein. These elements also can be embedded in a computer program product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

The present arrangements can be embodied in other forms without departing from the spirit or essential attributes thereof. Accordingly, reference should be made to the following claims, rather than to the foregoing specification, as indicating the scope of the invention.

The invention claimed is:

1. A method of creating distinct user spaces, comprising:
in a platform originally intended to be a single user platform, for each of a plurality of users:
via a processor, assigning to a first application used by the user a user identifier (UID) unique to the user and the first application;
associating the first UID with user data exclusively associated with the user and the first application to create a multi-user platform; and
allocating to the user a range of UIDs, wherein the first UID is selected from the range of UIDs.

2. The method according to claim 1, further comprising:
assigning to a second application used by the user a second UID unique to the user and the second application; and
associating the second UID with user data exclusively associated with the user and the second application.

3. The method of claim 1, further comprising:
assigning to applications used by the user the UIDs from the range of UIDs in a serially incrementing manner.

4. The method of claim 3, further comprising: when at least one of the applications used by the user is removed from the single user platform, returning a corresponding UID to a pool of available UIDs.

5. The method of claim 1, further comprising:
allocating for shared usage among the plurality of users a range of UIDs.

6. The method of claim 1, further comprising:
allocating for system or administrative use a range of UIDs.

7. The method of claim 1, further comprising:
receiving from a process a request to access the user data, the request indicating the first UID exclusively unique to the user and the first application; and
allowing the process to access the user data corresponding to the user and the first application.

8. A processing system, comprising:
a processor configured to, in a platform originally intended to be a single user platform, for each of a plurality of users:
assign to a first application used by the user a first user identifier (UID) unique to the user and the first application;
associate the first UID with user data exclusively associated with the user and the first application to create a multi-user platform; and
allocate to the user a range of UIDs, wherein the first UID is selected from the range of UIDs.

9. The processing system of claim 8, wherein the processor further is configured to:
assign to a second application used by the user a second UID unique to the user and the second application; and
associate the second UID with user data exclusively associated with the user and the second application.

10. The processing system of claim 8, wherein the processor further is configured to:
allocate for shared usage among the plurality of users a range of UIDs.

11. The processing system of claim 9, wherein the processor further is configured to:
receive from a process a request to access the user data, the request indicating the first UID exclusively unique to the user and the first application; and
allow the process to access the user data corresponding to the user and the first application.

12. A method of creating distinct user spaces, comprising:
in a platform originally intended to be a single user platform in which applications are assigned unique user identifiers (UID), via a processor, assigning a first unique UID to a first user and a first application to be used by a first user; and
via the processor, assigning a second unique UID to a second user and a second application to be used by a second user, wherein the assignment of the first and second UIDs isolates user data associated with the first application and the first user from user data associated with the second application and the second user and results in a multi-user platform;
assigning a first range of unique UIDs to the first user, wherein the first unique UID assigned to the first user and the first application is from the first range of unique UIDs; and
assigning a second range of unique UIDs to the second user, wherein the second unique UID assigned to the second user and the second application is from the second range of unique UIDs.

13. The method according to 12, further comprising:
assigning a common range of unique UIDs to the first user and the second user;
assigning a unique UID from the common range to an application to be used by the first user and the second user to enable the first user and second user to share resources.

14. The method according to claim 12, wherein assigning the first unique UID to the first user and the first application and assigning the second unique UID to the second user and the second application is performed in a serially incrementing manner.

15. The method according to claim 14, wherein the second unique UID has a higher integer value in comparison to the first unique UID.

16. The method according to claim 14, further comprising saving the first unique UID and the second unique UID to storage such that information on the UID subsets for the first user and the second user is available.

17. The method according to claim 12, wherein assigning the first range of unique UIDs and assigning the second range of unique UIDs is done in an equal-weighted fashion such that an equivalent number of UIDs are assigned to the first range and the second range or is done in a non-equal-weighted fashion such that one range of the first range and the second range has a greater number of UIDs in comparison to the other.

* * * * *